(12) United States Patent
Haff et al.

(10) Patent No.: US 12,291,174 B2
(45) Date of Patent: May 6, 2025

(54) FRONT SECTION OF A MOTOR VEHICLE

(71) Applicant: Bayerische Motoren Werke Aktiengesellschaft, Munich (DE)

(72) Inventors: Oliver Haff, Munich (DE); Felix Schumacher, Munich (DE); Jasmin Tahan, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 304 days.

(21) Appl. No.: 17/427,983

(22) PCT Filed: Jan. 13, 2020

(86) PCT No.: PCT/EP2020/050722
§ 371 (c)(1),
(2) Date: Aug. 3, 2021

(87) PCT Pub. No.: WO2020/169268
PCT Pub. Date: Aug. 27, 2020

(65) Prior Publication Data
US 2022/0118948 A1    Apr. 21, 2022

(30) Foreign Application Priority Data
Feb. 19, 2019 (DE) .................. 10 2019 104 154.6

(51) Int. Cl.
*B60S 1/50* (2006.01)
*B62D 25/12* (2006.01)

(52) U.S. Cl.
CPC ............... *B60S 1/50* (2013.01); *B62D 25/12* (2013.01)

(58) Field of Classification Search
CPC ......... B60S 1/50; B62D 25/12; B62D 25/105; B60R 19/20; B60R 21/34; A47C 27/08; A47C 27/085
See application file for complete search history.

(56) References Cited

U.S. PATENT DOCUMENTS

| | | | |
|---|---|---|---|
| 6,375,251 B1 | 4/2002 | Taghaddos | |
| 9,914,486 B2 * | 3/2018 | Remes | .................. B62D 25/12 |
| 2004/0142232 A1 | 7/2004 | Risca et al. | |
| 2005/0140753 A1 | 6/2005 | Tsukahara et al. | |
| 2008/0290693 A1 | 11/2008 | Melz et al. | |
| 2008/0296918 A1 | 12/2008 | Mueller et al. | |
| 2012/0292949 A1 | 11/2012 | Schneider et al. | |
| 2013/0206775 A1 | 8/2013 | Heidemeyer et al. | |

(Continued)

FOREIGN PATENT DOCUMENTS

| | | |
|---|---|---|
| CN | 1636742 A | 7/2005 |
| CN | 101151169 A | 3/2008 |

(Continued)

OTHER PUBLICATIONS

Computer translation for DE-10009178-A1 (Year: 2001).*

(Continued)

*Primary Examiner* — Jason S Morrow
(74) *Attorney, Agent, or Firm* — Crowell & Moring LLP (57) ABSTRACT

A front section of a motor vehicle includes an engine hood and a chassis. Support parts of the chassis are arranged in a receiving space of the front section body, at least partly below the engine hood. A water-fillable multi-chamber pad is arranged at least in a first partial region of the receiving space.

15 Claims, 6 Drawing Sheets

(56) References Cited

U.S. PATENT DOCUMENTS

2016/0377189 A1* 12/2016 Eells .................. F16K 15/1825
            137/14
2018/0009484 A1   1/2018 Remes

FOREIGN PATENT DOCUMENTS

| CN | 102785705 A | 11/2012 | | |
|---|---|---|---|---|
| CN | 103025559 A | 4/2013 | | |
| CN | 203346065 U | 12/2013 | | |
| CN | 204172862 U | 2/2015 | | |
| CN | 106577186 A | 4/2017 | | |
| CN | 207078207 U | 3/2018 | | |
| DE | 36 16 737 C1 | 6/1987 | | |
| DE | 39 16 337 A1 | 10/1990 | | |
| DE | 41 23 947 A1 | 1/1993 | | |
| DE | 10009178 A1 * | 9/2001 | ................ | B60S 1/50 |
| DE | 103 24 270 A1 | 12/2004 | | |
| DE | 103 35 258 A1 | 3/2005 | | |
| DE | 20 2017 103 843 U1 | 9/2017 | | |
| FR | 3 044 991 A1 | 6/2017 | | |
| WO | WO 2014/124202 A1 | 8/2014 | | |
| WO | WO-2018189019 A1 * | 10/2018 | .............. | B60S 1/481 |

OTHER PUBLICATIONS

WO-2018189019-A1 computer translation (Year: 2018).*
International Search Report (PCT/ISA/210) issued in PCT Application No. PCT/EP2020/050722 dated Jun. 23, 2020 with English translation (eight (8) pages).
German-language Written Opinion (PCT/ISA/237) issued in PCT Application No. PCT/EP2020/050722 dated Jun. 23, 2020 (eight (8) pages).
German-language Search Report issued in German Application No. 10 2019 104 154.6 dated Jan. 31, 2020 with partial English translation (13 pages).
English translation of Chinese Office Action issued in Chinese Application No. 202080012678.5 dated May 11, 2023 (11 pages).

* cited by examiner

FRONT SECTION OF A MOTOR VEHICLE

BACKGROUND AND SUMMARY OF THE INVENTION

The invention relates to a front section of a motor vehicle, as well as to a branching water line system for a motor vehicle.

A front section of a motor vehicle has a front section body which comprises a front hood that can be opened and closed. Furthermore provided is a chassis of which the structural parts are disposed in a receptacle space of the front section body and are at least in part situated here under the front hood.

The generic front section furthermore has a windshield washer tank which is usually configured as a blow-molded part and in the front section is positioned on a lateral wall behind or in front of the wheel arch. Windshield washer tanks with approx. five liters of windshield washer water (fluids) are currently provided. However, a larger windshield washer water volume (approx. 35 liters) will be required in the future in order to clean the sensor system with a view to fully automatic driving. This is required in order to ensure the functioning of the sensors. For this reason, installation space has to be kept available in the front section.

It is therefore an object of the present invention to achieve a front section of the type stated above, in which it is possible for an increased volume of fresh water, in particular of at least 35 liters of water, to be provided even in the case of a minor installation space. As understood by one skilled in the art, the term water includes other appropriate fluids.

This object is achieved by the features of the independent claims. The dependent claims contain advantageous refinements of the invention.

Specifically, in a front section according to the invention at least one multi-chamber pad is disposed in a sub-region of the receptacle space.

This results inter alia in the advantages that a functional integration, or an integral construction mode, respectively, is made possible by an intelligent utilization of installation space, this representing the primary advantage of the solution according to the invention. It is furthermore possible for the pneumatics of the front section to be utilized for cleaning sensors and for achieving improved driving dynamics in terms of the tank because the windshield wiper water, as opposed to known tank systems, can advantageously be distributed in the multi-chamber pad, this enabling the significant enlargement of the water volume and thus adequate cleaning of the sensors, on the one hand, and moreover improves the acoustics of the front section according to the invention because sloshing of water, as arises in known water tanks, can be avoided.

It is furthermore possible for the hinge of an active front hood to be dispensed with, the front hood in the event of an impact by an object such as, for example, a branch of a tree falling thereon, being able to be raised by a few centimeters by a lifting mechanism.

Finally, considerable advantages result in terms of more cost-effective production costs, a lower complexity in assembling, and savings in terms of components.

In a particularly preferred embodiment, it is possible that of the chambers of the multi-chamber pad only those chambers that are situated in a central region of the multi-chamber pad are fluidically connected to a branching water line system, and accordingly only the central region is filled with water, this resulting in the advantage that in the event of a motor vehicle provided with the front section according to the invention impacting an obstacle, a displacement of the water from the central region into the surrounding region of the central region is made possible, this in turn advantageously enabling the absorption of crash energy. In a particularly preferred embodiment here it is possible for throttles such as, for example, in the form of throttle creases or throttle valves to be provided between some or even all of the chambers of the multi-chamber pad, the throttles being able to retain the water introduced into the respective chamber in the latter, on the one hand, and when an external pressure is applied to make it possible in a targeted manner that water from one chamber filled with this water overflows into an empty chamber. Here, the absorption of energy, in particular in the event of a crash, can be set by way of the design or the layout of the throttle, respectively, so as to be a function of the impulse, for example.

Overall, the behavior of the multi-chamber pad in the event of a crash may be influenced by the following possibilities.

The water escapes from the multi-chamber pad, should the latter be completely filled with water.

The water is distributed into chambers of the multi-chamber pad that are not filled with water.

The multi-chamber pad is only filled with air.

In principle, the structure (multi-chamber pad) adapts to the external contour. To this end, a combination of solid and deformable regions may be used. The solid regions offer a sufficient basic stability and enable enough liquid to be stored, on the one hand. The deformable component parts having the throttle become relevant above all in the exceptional states described.

The connection of the chambers of the multi-chamber pad can take place in the plane as well as across a plurality of planes which are disposed on top of one another. A further possibility lies in filling the chambers in each case with air or water in a pattern. A filling of this type improves the behavior of the multi-chamber pad in the event of a crash.

It is furthermore contemplated for a pneumatic controller to be used in one swoop for building up the pressure for cleaning the sensors with a view to fully automatic driving.

The form of the multi-chamber pad is possible in various structures and arrangements, for example, in the form of a leaf structure which stores water. It is furthermore possible for a structure of this type to be implemented by hoses in which water is stored, this resulting in the advantage that hoses of this type result in a structure which absorbs crash energy.

A multi-chamber system which, as has already been mentioned above, has outer chambers which are filled with air, while inner chambers are filled with water such that the water from the inner chambers can be forced or pumped, respectively, into the outer chambers in the event of a crash.

If a branching water line system which can be formed by a central line and by branch lines branching off from the latter is used alongside the multi-chamber pad, it is possible for a central filling device by way of which the lines of the branching system can be filled with water to be provided.

This filling device can be configured as a simple filler neck or as a filler neck having a valve and a controller.

In a further particularly preferred embodiment, the multi-chamber pad and, should a branching water line system be provided, also the branching system is/are disposed below the front hood. In a further particularly preferred embodiment, the internal face of the front hood that points toward the receptacle space can in this case be used as an installation space for attaching the multi-chamber pad and/or the branching system.

In a further particularly preferred embodiment, it is possible for a further branching water line system to be provided in a second sub-region of the receptacle space, wherein the second branching system can be without a multi-chamber pad or combined with one or a plurality of multi-chamber pads.

In order for the absorption of crash energy to be further improved, in a further particularly preferred embodiment it is possible for the multi-chamber pad and/or the branching system or branching systems, respectively, to be produced from a material that permits deformation.

In a further embodiment, in the case of two branching systems it is possible for the filling device to be configured as a central filling device for both branching systems.

A preferably inflatable 3D-printed material is particularly preferable as the material for the branching system or branching systems, respectively, and/or the multi-chamber pad.

The front hood of the front section according to the invention can be configured as an active or passive front hood.

The invention furthermore relates generally to a motor vehicle having a body which has a front section body, adjacent thereto a passenger cabin, and in turn again adjacent to the passenger cabin a rear section body. The multi-chamber pads here are configured as an insert component which can be located in different installation spaces in the vehicle, for example. To this end, it would be possible for at least one multi-chamber pad to be disposed in the trunk or in a bumper of the motor vehicle, for example. This disposal in the rear section body would advantageously result in a positive effect in terms of a rear crash.

As a result thereof, it would advantageously be possible to provide an actuation capability of the chambers of the multi-chamber pad that are to be deformed, or of the entire multi-chamber pad, respectively. This in turn advantageously enables the configuration of a region which is capable of being optimally deformed in the event of a crash, and thus of a maximum absorption capability in the event of crash.

The internal structure here advantageously adapts to the external structure. This is enabled by the dimensionally stable regions and deformable regions being combined or connected, respectively.

This actuation is used in a targeted manner by means of a throttle action, in particular in the form of throttles such as throttle valves or throttle creases, or else other actuation methods, so as to enable an ideal deformation in the event of a crash.

An improvement of a structure can in particular be achieved by adapting a movement of the internal structure to the external structure. In the case of a multi-chamber pad this can be achieved by the following criteria: Combining rigid regions with movable, shape-changing, regions on the vehicle.

When impinged by a force (for example in the event of a crash), the deformable region of the multi-chamber pad can be deformed but revert to the initial state should this be desirable, such as when chambers, or multi-chamber pads, respectively, of this type are used in specific regions of a vehicle.

The force here can act from all directions, is thus not limited to one direction of action.

It is moreover important that the multi-chamber pad (the structure) does not necessarily have to be a windshield washer tank but that a structure of this type can be used in general.

The disposal of a multi-chamber pad, or of a system of multi-chamber pads, respectively, is contemplated in different installation spaces in the vehicle, wherein the system can additionally also be a separate compact insert component (for example for a trunk of a motor vehicle). It is thus contemplated for a multi-chamber pad or a system of multi-chamber pads to be disposed in the rear section, for example, in particular a secondary trunk, such that the water can be discharged in a targeted manner in the event of a rear crash, without water exiting into the interior of the motor vehicle.

A branching water line system according to the invention, as an object that can be independently marketed, is defined in the claims.

Further details, features and advantages of the invention are derived from the description hereunder of exemplary embodiments by means of the drawings.

DETAILED DESCRIPTION OF THE DRAWINGS

Figure 1:
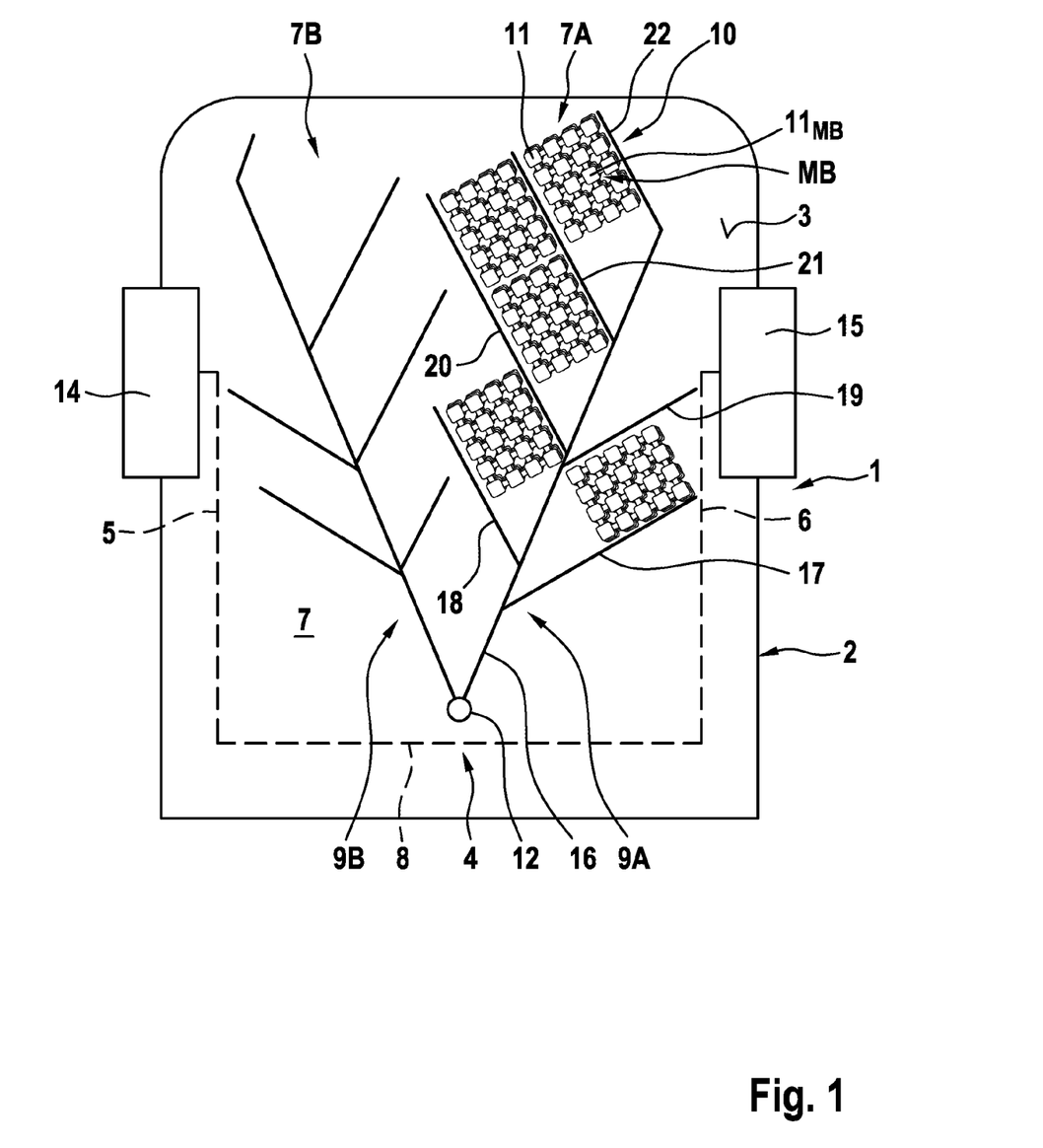
FIG. 1 shows a schematically highly simplified plan view of a front section according to an embodiment of the invention.

FIG. 1 shows a schematically heavily simplified illustration of a front section 1 of a motor vehicle, the front section 1 having a front section body 2 with a front hood 3. A chassis 4, indicated by dashed lines, is disposed in a receptacle space 7 of the front section body 2. The structural parts of the chassis 4 which are disposed in the receptacle space 3 are symbolized by the reference signs 5, 6, wherein the structural parts 5 and 6 are parts which are disposed under the front hood 3.

As has been mentioned at the outset, it is possible according to the invention for a multi-chamber pad (multi-chamber cushion) 10 which is able to be filled with water to be disposed in a first sub-region 7A of the receptacle space 7.

In the particularly preferred embodiment of the front section according to the invention illustrated in FIG. 1, a branching water line system 9A is disposed in the first sub-region 7A next to the multi-chamber pad 10, or in this case a plurality of multi-chamber pads 10, respectively. This branching system 9A comprises a main or central line 16, six branch lines 17 to 22 branching off from the latter in the exemplary case illustrated. This however represents only one potential example because it is possible for more or fewer branch lines of this type to be provided.

Because a total of five multi-chamber pads 10 are provided in the embodiment of FIG. 1, which is to be understood to be only exemplary, all of the branch lines 17 to 22 can be fluidically connected to these multi-chamber pads 10. However, it is also contemplated that not all multi-chamber pads 10 of the embodiment according to FIG. 1 are fluidically connected to the assigned branch lines 17 to 22, for example should it be advantageous for one or a plurality of these multi-chamber pads 10 to be filled only with air.

As has been mentioned at the outset, it is furthermore possible for the multi-chamber pads 10 to be only partially filled with water, this being highlighted by means of the uppermost multi-chamber pad 10 in FIG. 1. In this multi-chamber pad 10 a central region MB of six chambers $11_{MB}$ which is surrounded by 14 outer chambers 11 is provided, wherein it is preferably provided in this case that only the central chambers $11_{MB}$ are filled with water since it is in this case possible for the water to be displaced from the central chambers $11_{MB}$ into the outer chambers 11 so as to absorb crash energy in the event of a crash.

In the particularly preferred embodiment illustrated in FIG. 1, a further branching system 9B which can likewise be constructed from a main line and branch lines is furthermore disposed in a second sub-region 7B of the receptacle space 7. In the embodiment illustrated in FIG. 1, this second branching system 9B is not connected to multi-chamber pads, this however being likewise possible in principle. Of course, it would also be contemplated for only one of the branching systems 9A or 9B to be disposed with or without multi-chamber pads 10 in the receptacle space.

FIG. 1 in a schematically heavily simplified manner furthermore highlights a feeding device 12, which in the case of two branching systems 9A and 9B represents a central feeding device, for example in the form of a filler neck.

Figure 2:
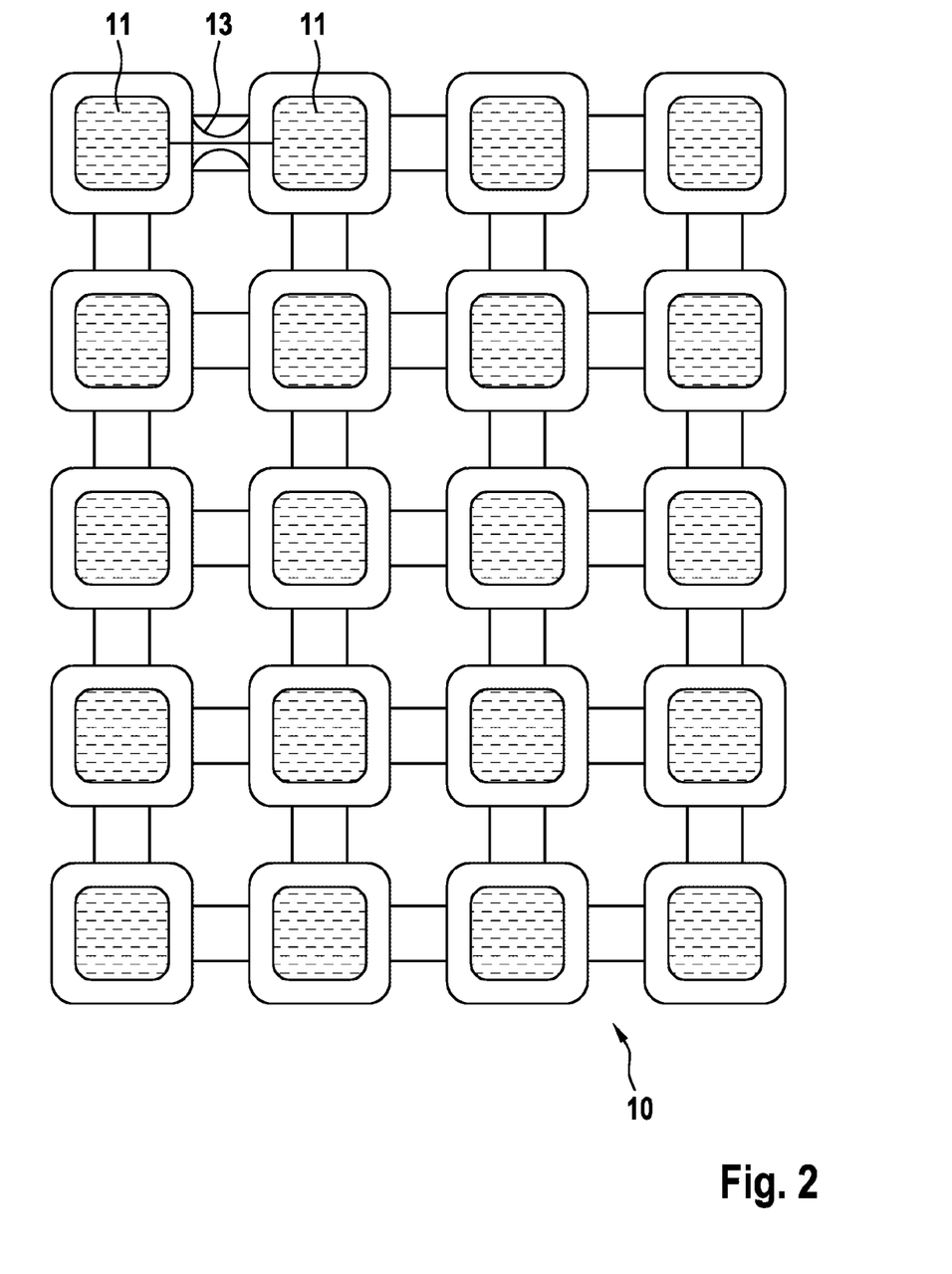
FIG. 2 shows a schematically simplified plan view of a first embodiment of a multi-chamber pad in a state partially filled with water and air.

FIG. 2 highlights a schematically simplified plan view of a potential embodiment of a multi-chamber pad 10 which in this exemplary case is a single-layer multi-chamber pad 10 having 20 chambers 11, for example. In a manner representative for all chambers, two of the chambers are identified by the reference sign 11, wherein a throttle 13 is disposed between these chambers 11. This throttle 13 can be, for example, a throttle valve or else a crease of the material of the multi-chamber pad 10, the throttle having the effect that water filled in the respective chambers remains in said chambers until the resistance built-up by the throttle 13 can be overcome by applying pressure, such as in the event of a crash, for example, such that all of the chambers and optionally connecting lines are filled with water, as is highlighted in FIG. 3.

Figure 3:
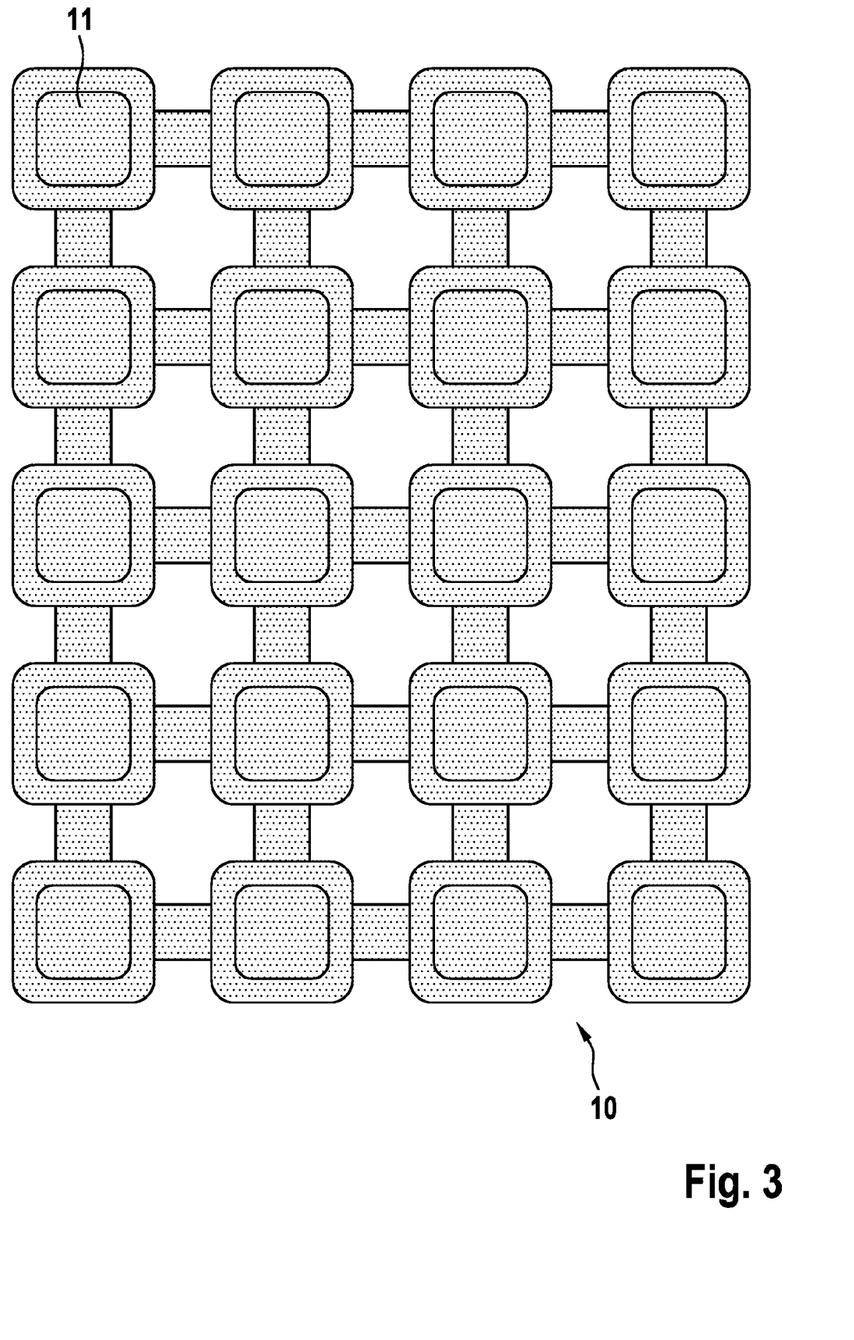
FIG. 3 shows an illustration of the multi-chamber pad, corresponding to that of FIG. 2, in a state filled completely with water.

Provided in such a case is not only one throttle 13 but of course a number of throttles corresponding to the number of chambers to be throttled.

Figure 4:
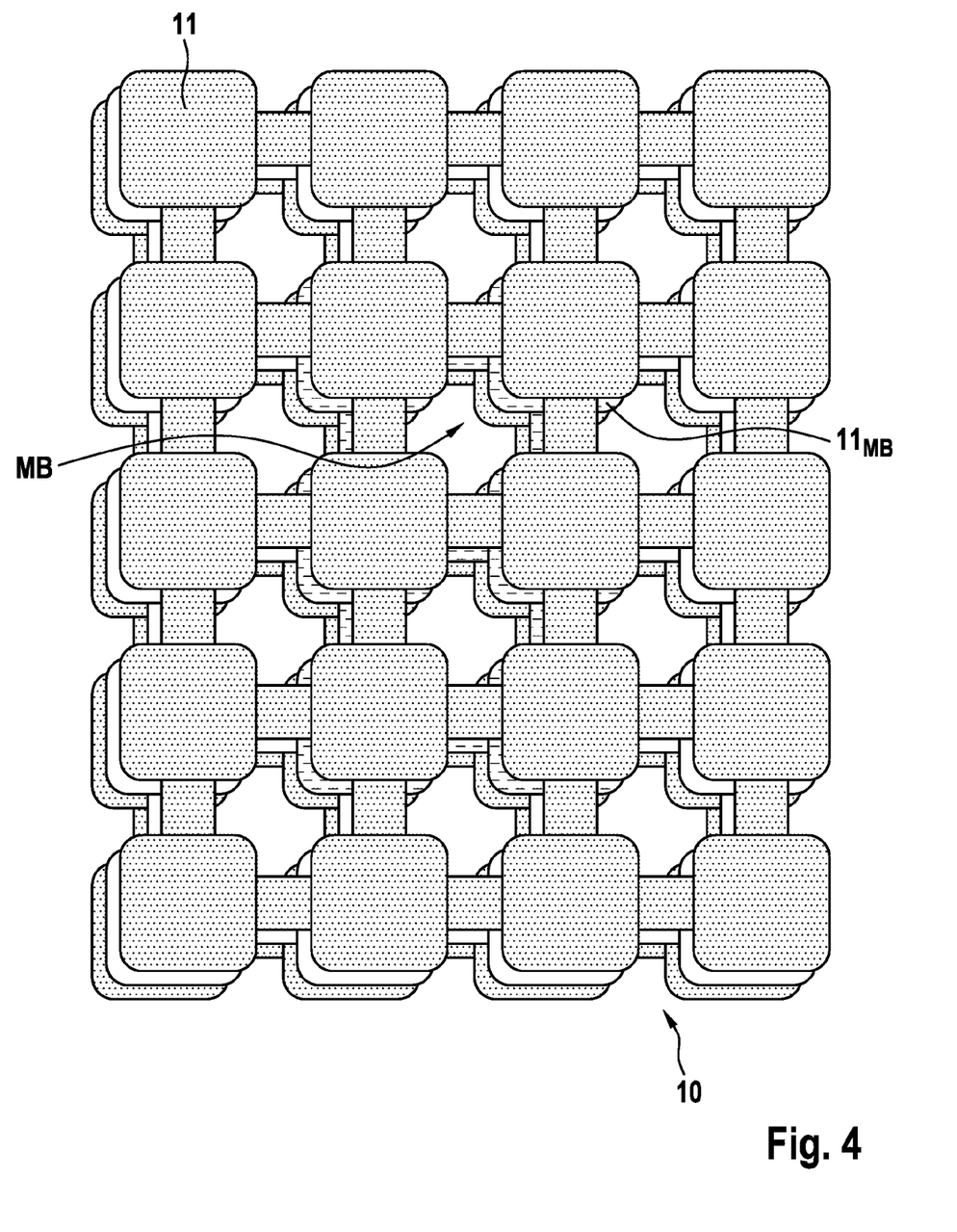
FIG. 4 shows an illustration of a further embodiment of the multi-chamber pad, corresponding to that of FIGS. 2 and 3, having layers disposed on top of one another, wherein only chambers of a central region are partially filled with water.
Figure 5:
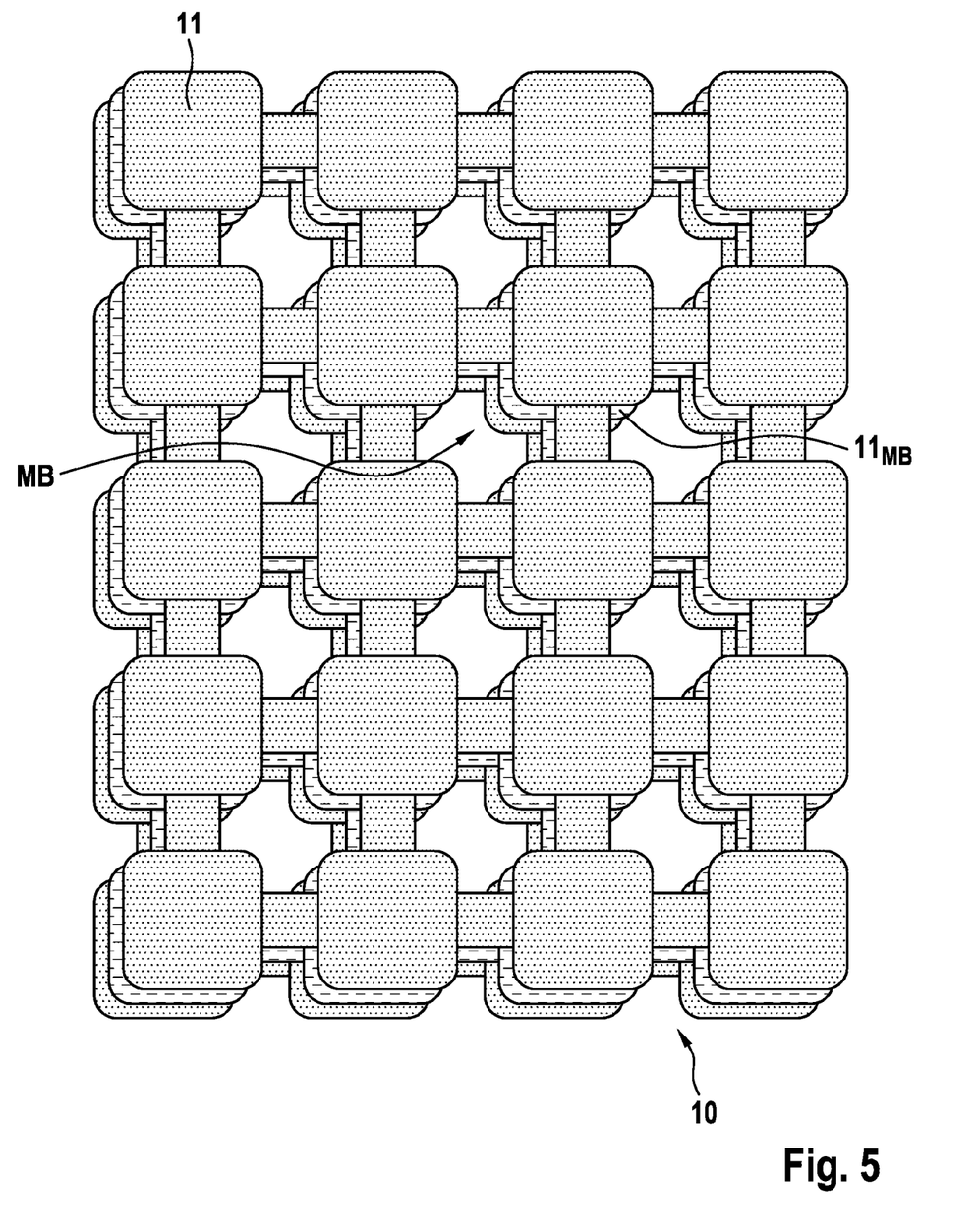
FIG. 5 shows an illustration of the multi-chamber pad, corresponding to that of FIG. 4, in a state in which the chambers of the central region are completely filled with water.

FIGS. 4 and 5 highlight an embodiment of a multi-layer multi-chamber pad 10, wherein the central region MB which can also be seen in FIG. 1 is in each case identified in FIGS. 4 and 5, the central region MB having chambers filled with water, one of these chambers being identified by the reference sign $11_{MB}$. Also in this case, corresponding throttles are of course provided in order for the water to be retained in the central region MB until an external application of pressure causes the distribution of the water into all of the chambers of the central region MB, this being highlighted in FIG. 5.

Figure 6:
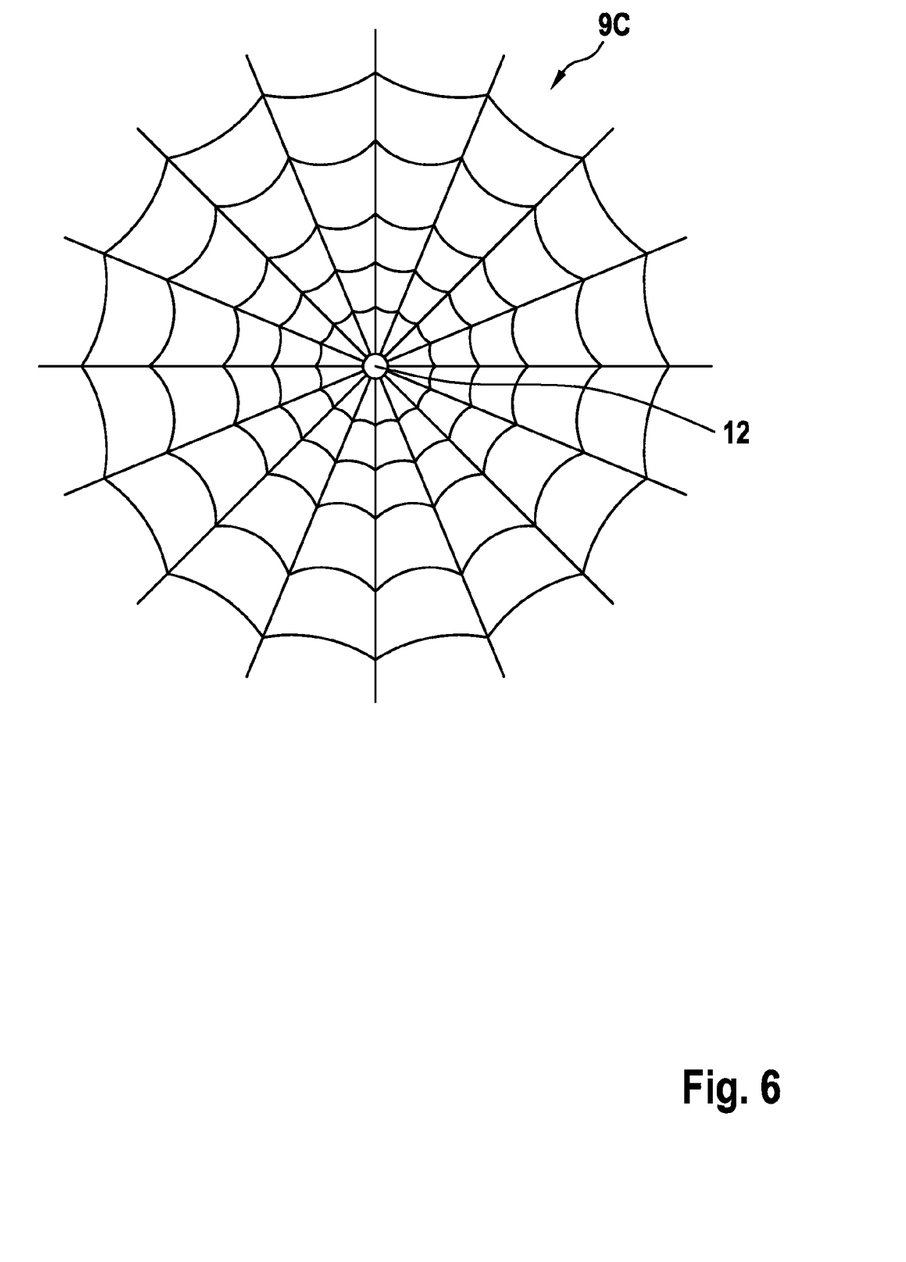
FIG. 6 shows a further embodiment of the multi-chamber pad in the form of a leaf structure.

FIG. 6 shows an embodiment of a multi-chamber pad 9C in the form of a leaf structure, similar to a spider's web, which can be constructed from hoses which are fluidically connected to one another and be provided with a central filling device 12, as is likewise shown in a purely exemplary manner in FIG. 6.

In addition to the above written disclosure of the invention, reference is hereby explicitly also made to the illustrative disclosure of the invention in FIGS. 1 to 6 to supplement the disclosure.

LIST OF REFERENCE SIGNS

1 Front section
2 Front section body
3 Front hood
4 Chassis
5, 6 Structural parts of the chassis 4
7 Receptacle space
7A First sub-region
7B Second sub-region
8 Structural parts which are not disposed under the front hood 3
9A, 9B Branching water line system
10 Multi-chamber pad
11 Chambers
11 MB Chambers in a central region MB of the multi-chamberpad 10
12 Filling device
13 Throttle
14, 15 Wheels
16 Main line
17 to 22 Branch lines

What is claimed is:

1. A front section of a motor vehicle, comprising:
a front section body which has a front hood;
a chassis having structural parts disposed in a receptacle space of the front section body so as to be at least in part under the front hood;
a multi-chamber pad which is fillable with sufficient water to wash all sensors used in a fully automated driving mode of the motor vehicle, the multi-chamber pad being disposed at least in a first sub-region of the receptacle space; and
a branching water line system fluidically connected to the at least one multi-chamber pad, the branching water line system being disposed in the first sub-region, wherein
at least one throttle is provided between some or all chambers of the multi-chamber pad,
the at least one throttle retains water, and
only those chambers of the multi-chamber pad that are disposed in a central region are fluidically connected to the branching system.

2. The front section according to claim 1, wherein the branching system is able to be filled with water by way of a central filling device.

3. The front section according to claim 2, wherein the central filling device is in the form of a filler neck.

4. The front section according to claim 2, wherein the central filling device is configured as a filler neck having a valve and a controller.

5. The front section according to claim 1, wherein the multi-chamber pad and/or the branching system is disposed under the front hood on an internal surface of the front hood that faces toward the receptacle space.

6. The front section according to claim 2, further comprising:
at least one further branching water line system provided in a second sub-region.

7. The front section according to claim 6, wherein
at least one of the branching systems and/or the multi-chamber pad is produced from a material that permits deformations.

8. The front section according to claim 6, wherein
the filling device is a central filling device for both branching systems.

9. The front section according to claim 1, wherein
a material of the branching system and/or of the multi-chamber pad is an inflatable 3D-printed material.

10. The front section according to claim 1, wherein
the front hood is configured as an active or passive front hood.

11. A motor vehicle, comprising:
a body comprising a front section body, adjacent thereto a passenger cabin, and adjacent to the passenger cabin a rear section body;
at least one multi-chamber pad disposed in at least one receptacle space of the front section body, of the passenger cabin and/or of the rear section body; and
a branching water line system fluidically connected to the at least one multi-chamber pad, the branching water line system being disposed in a first sub-region of the receptacle space, wherein
  the at least one multi-chamber pad is configured to hold water in an amount that is sufficient to wash all sensors used in a fully automated driving mode of the motor vehicle,
  at least one throttle is provided between some or all chambers of the multi-chamber pad,
  the at least one throttle retains water, and
  only those chambers of the multi-chamber pad that are disposed in a central region are fluidically connected to the branching system.

12. The motor vehicle according to claim 11, wherein
the branching system is able to be filled with water by way of a central filling device.

13. The motor vehicle according to claim 12, wherein
the central filling device is configured as a filler neck having a valve and a controller.

14. The motor vehicle according to claim 11, wherein
the multi-chamber pad and/or the branching system is disposed under a front hood on an internal surface of the front hood that faces toward the receptacle space.

15. A branching water line system of a motor vehicle, comprising:
at least one main line;
at least one branch line which is fluidically connected to the main line;
a filling device; and
a branching water line system fluidically connected to the at least one multi-chamber pad, the branching water line system being disposed in a first sub-region of the receptacle space, wherein
  the branching system is comprised of an inflatable 3D-printed material,
  the main line and/or the at least one branch line is fluidically connected to at least one multi-chamber pad,
  the at least one multi-chamber pad is configured to hold water in an amount that is sufficient to wash all sensors used in a fully automated driving mode of the motor vehicle, and
  only those chambers of the multi-chamber pad that are disposed in a central region are fluidically connected to the branching system.

* * * * *